(12) United States Patent
Schuster

(10) Patent No.: US 11,945,314 B2
(45) Date of Patent: Apr. 2, 2024

(54) METHOD FOR OPERATING A DRIVE TRAIN, AND DRIVE TRAIN

(71) Applicant: SEW-EURODRIVE GMBH & CO. KG, Bruchsal (DE)

(72) Inventor: Thomas Schuster, Ottenbach (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 456 days.

(21) Appl. No.: 17/311,503

(22) PCT Filed: Nov. 28, 2019

(86) PCT No.: PCT/EP2019/025422
§ 371 (c)(1),
(2) Date: Jun. 7, 2021

(87) PCT Pub. No.: WO2020/114626
PCT Pub. Date: Jun. 11, 2020

(65) Prior Publication Data
US 2022/0016983 A1     Jan. 20, 2022

(30) Foreign Application Priority Data
Dec. 6, 2018 (DE) .......................... 102018009518.6

(51) Int. Cl.
*B60L 15/20* (2006.01)
*B60L 3/12* (2006.01)

(52) U.S. Cl.
CPC .................. *B60L 15/20* (2013.01); *B60L 3/12* (2013.01); *B60L 2240/421* (2013.01);
(Continued)

(58) Field of Classification Search
CPC ...... B60L 15/20; B60L 3/12; B60L 2240/421; B60L 2240/423; B60L 2240/427; B60L 2240/429; B60L 2260/40
See application file for complete search history.

(56) References Cited

U.S. PATENT DOCUMENTS 5,175,483 A   12/1992  Fujii et al.
7,781,996 B2   8/2010  Tajima
(Continued)

FOREIGN PATENT DOCUMENTS

DE           69120486 T2   10/1996
DE       102007028914 A1   12/2007
(Continued)

OTHER PUBLICATIONS

Mohammed Bouheraoua et al. Speed control for a pseudo direct drive permanent-Magnet Machine with one position sensor on low speed rotor (Dec. 2014) IEEE Transactions on industry applications vol. 50 No.6 (Year: 2014).*
(Continued)

*Primary Examiner* — Gertrude Arthur Jeanglaude
(74) *Attorney, Agent, or Firm* — Carter, DeLuca & Farrell LLP

(57) ABSTRACT

A method for operating a drive train includes supplying a motor voltage to an electric motor by a converter for achieving a torque setpoint value, determining an angular velocity actual value and an angular acceleration actual value from values of the angular position of the rotor, determining the torque setpoint value from a moment of inertia and an angular acceleration setpoint value, which is determined as an actuation variable, determining the moment of inertia as the sum of the moment of inertia of the drive train without a load and the moment of inertia of the load, and determining the moment of inertia of the load from a torque actual value and from the angular acceleration actual value.

18 Claims, 5 Drawing Sheets

(52) U.S. Cl.
CPC ... *B60L 2240/423* (2013.01); *B60L 2240/427* (2013.01); *B60L 2240/429* (2013.01); *B60L 2260/40* (2013.01)

(56) References Cited

U.S. PATENT DOCUMENTS

| | | | | |
|---|---|---|---|---|
| 9,505,414 | B2* | 11/2016 | Planche | F16H 61/0202 |
| 2009/0167234 | A1* | 7/2009 | Uechi | H02M 1/32 |
| | | | | 180/65.285 |
| 2014/0042938 | A1* | 2/2014 | Shoji | H02P 21/0089 |
| | | | | 318/400.02 |
| 2018/0034391 | A1* | 2/2018 | Okita | H02P 6/16 |

FOREIGN PATENT DOCUMENTS

| | | | |
|---|---|---|---|
| EP | 2690777 | A2 | 1/2014 |
| JP | 3479922 | B2 | 12/2003 |

OTHER PUBLICATIONS

International Search Report issued in corresponding International Application No. PCT/EP2019/025422, dated Jan. 31, 2020, pp. 1-2, English Translation.

Sainio, J., "Backlash compensation in electric vehicle powertrain" Master's Thesis Espoo, Aalto University (Apr. 18, 2016) pp. 1-121.

\* cited by examiner

METHOD FOR OPERATING A DRIVE TRAIN, AND DRIVE TRAIN

FIELD OF THE INVENTION

The present invention relates to a method for operating a drive train and to a drive train.

BACKGROUND INFORMATION

In certain converter-fed electric motors, it is conventional that the signal electronics determines the actual value of the torque based on the acquired motor current, the motor voltage, and/or the characteristic of the acquired angular position of an electric motor.

In the same manner, it is conventional in certain converters to supply an electric motor with a motor voltage such that the electric motor is controlled to a torque setpoint value.

German Patent Document No. 10 2007 028 914 describes a device for controlling and/or regulating the speed of an electric motor.

German Patent Document No. 691 20 486 describes a method for calculating the moment of inertia in a motor speed controller.

SUMMARY

Example embodiments of the present invention provide an improved control quality in the control of an electric motor.

According to an example embodiment of the present invention, in a method for operating a drive train that includes an electric motor and a load which is driven by the electric motor or by a gear unit driven by the electric motor, and a sensor, e.g., is situated on the electric motor, for acquiring the angular position of a rotor of the electric motor, a motor voltage is supplied to the electric motor with the aid of the converter, e.g., with the aid of a motor control device of the converter, for achieving a torque setpoint value M_Soll, an angular velocity actual value ω_ist and an angular acceleration actual value α_ist are determined, e.g., in a recurrent manner over time, from the values of the angular position of the rotor acquired with the aid of the sensor, the torque setpoint value M_Soll is determined from a moment of inertia J_ges and an angular acceleration setpoint value α_Soll, which is determined as an actuation variable by an rpm control member to which the difference, e.g., the system deviation, between angular velocity actual value co ist and angular velocity setpoint value ω_Soll, is supplied, the moment of inertia J_ges is determined as the sum of the moment of inertia J_Mot of the drive train without a load and the moment of inertia J_Last of the load, and the moment of inertia J_Last of the load is determined from a torque actual value M_ist and from the angular acceleration actual value α_ist, e.g., while taking moment of inertia J_Mot into account.

This has the advantage that a control of the rotational speed and of the torque of the load is able to be carried out with a high control quality. This is because moment of inertia J_ges is able to be determined from the quotient of the torque actual value and the angular acceleration actual value. The determination of the torque actual value may be obtained based on the motor current and, e.g., another variable such as the motor voltage and/or the angular position of the rotor of the electric motor. The real value of the moment of inertia is therefore instantaneously determinable and can be utilized for the motor control, i.e., for example, the rpm control. The motor control is likewise able to be carried out, in which case the parameter for the moment of inertia used there is determined. Thus, in a change in the drive train, e.g., a change in the moment of inertia of the load, the moment of inertia is able to be determined and the control can therefore be carried out using a current value of the moment of inertia in each case.

According to example embodiments, torque actual value M_ist is determined from the motor current acquired with the aid of a current sensor and from the acquired values of angular position x of the rotor. This offers the advantage that a conventional method can be used for determining torque actual value M_ist.

According to example embodiments, torque actual value M_ist is determined from the motor current acquired with the aid of a current sensor and from the acquired motor voltage U and/or from the acquired values of angular position x of the rotor. This offers the advantage that a conventional method is able to be used for determining torque actual value M_ist.

According to example embodiments, moment of inertia J_Mot of the drive train without a load is predefined as a parameter. This is considered advantageous insofar as the moment of inertia of the rotor of the motor is able to be determined in a highly precise manner during the production of the motor, and J_Mot is therefore made known very precisely. Only the load-side moment of inertia or other moment of inertia thus has to be determined in order to obtain a reliable value for the moment of inertia.

According to example embodiments, the torque setpoint value M_Soll is formed as a product of moment of inertia J_ges and angular acceleration setpoint value α_Soll. This has the advantage that the torque is readily determined.

According to example embodiments, moment of inertia J_Last of the load is determined as a quotient, reduced by moment of inertia J_Mot, of torque actual value M_ist and angular acceleration actual value α_ist. This offers the advantage that a currently existing value of the moment of inertia of the load is able to be determined.

According to example embodiments, at a first instant, moment of inertia J_Last of the load is determined as a first quotient, reduced by moment of inertia J_Mot, of torque actual value M_ist and angular acceleration actual value α_ist, and angular acceleration actual value α_ist lies in a first value range, at a second instant after the first instant, moment of inertia J_Last of the load is determined as a second quotient, reduced by moment of inertia J_Mot, of torque actual value M_ist and angular acceleration actual value α_ist, and angular acceleration actual value α_ist lies in a second value range, and an updated moment of inertia J_Last is determined by adding to the previously determined value of moment of inertia J_Last the difference between the second and the first quotient. This has the advantage that the moment of inertia is able to be adapted, i.e., updated.

According to example embodiments, the first range is a value range of the angular acceleration, and the second range is another value range of the angular acceleration, and the two value ranges do not overlap but are spaced apart from each other. This offers the advantage that the best possible signal-to-noise ratio is achievable given sufficient spacing of the value ranges, and a reliable determination of the value of the moment of inertia is therefore achievable.

According to example embodiments, the respectively determined values, e.g., of moment of inertia J_Last of the load, are filtered, e.g., low-pass filtered. This has the advantage that the measuring noise is able to be reduced.

According to example embodiments, the rpm control member is arranged as a PI controller, it has a proportional element and an integral element, which is switched in parallel with the proportional element, the proportionality constant of the proportional element is a function of moment of inertia J_Mot and total moment of inertia J_ges, and the time constant of the integral element is a function of moment of inertia J_Last and the total moment of inertia J_ges. This offers the advantage that the function is able to be selected so that a drive train featuring backlash, that is to say, e.g., a connection featuring play, is able to be operated with the same control behavior, e.g., with the same time constant and the same transient characteristic, as the same drive train without the backlash, that is to say, e.g., with a connection free of play instead of the connection featuring play. In addition, the P element reacts according to the part of the drive train that is connected to the rotor of the electric motor free of play so that a correspondingly satisfactory control behavior is achievable within the backlash.

According to example embodiments, the rpm control member is arranged as a PI controller, it has a proportional element and an integral element, which is switched in parallel with the proportional element, the proportionality constant of the proportional element is a function of moment of inertia J_Last and total moment of inertia J_ges, and the time constant of the integral element is a function of moment of inertia J_Mot and of total moment of inertia J_ges. This offers the advantage that the function is able to be selected such that a drive train featuring backlash, and thus, for example, with a connection featuring play, is able to be operated with a similar control behavior as the same drive train without the backlash, i.e., for example, with a connection free of play instead of the connection exhibiting play. In addition, a control behavior that in essence is adapted to the load moment of inertia is also already activated within the backlash so that the transition from the range of the backlash to the range outside the backlash is carried out with barely a jerk. However, even outside the backlash, a low-jerk, greatly smoothed behavior is able to be achieved as a result of the small time constant.

According to example embodiments, the rpm control member is arranged as a PI controller, it has a proportional element and an integral element, which is switched in parallel with the proportional element, the proportionality constant of the proportional element is a function of the product of moment of inertia J_Mot and of moment of inertia J_Last of the load, and/or the time constant of the integral element is a function of the product of moment of inertia J_Mot and moment of inertia J_Last of the load. This is considered advantageous insofar as an optimized adjustment of the backlash is achievable because moment of inertia J_Mot and moment of inertia J_Last of the load are determined separately and multiplied by each other.

According to example embodiments of the present invention, a drive train is adapted to carry out a previously mentioned method. This offers the advantage that a high-quality control of the rotation of the load is able to be carried out.

Further features and aspects of example embodiments of the present invention are described in greater detail below with reference to the appended Figures.

Figure 4:
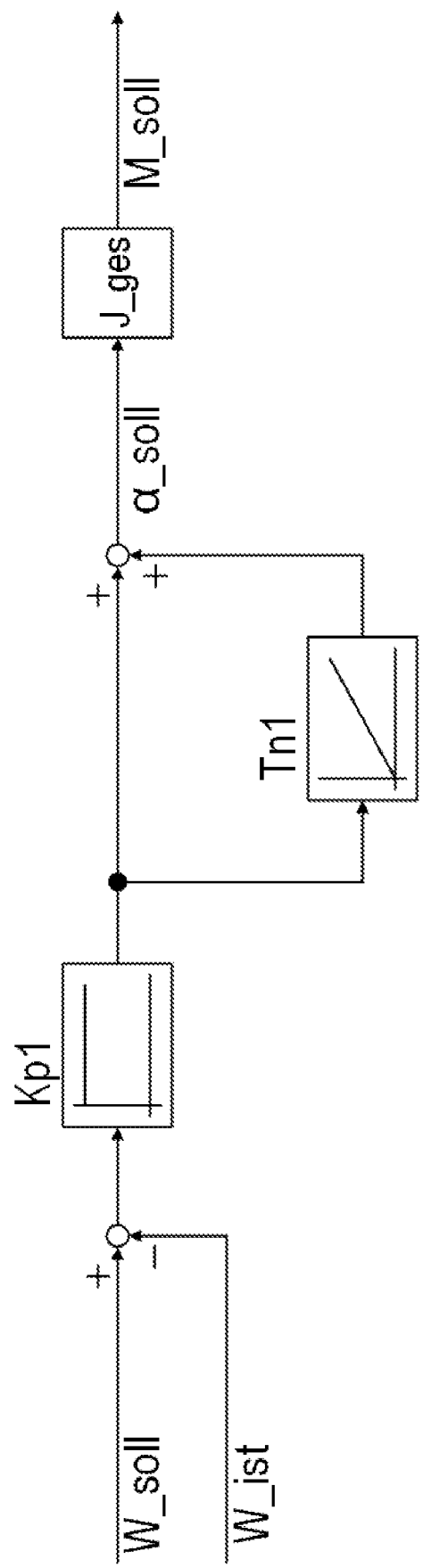
FIG. 4 schematically illustrates an exemplary rpm controller for determining torque setpoint value M_Soll, a proportional element having proportionality constant Kp1 and an integral element having characteristic parameter Tn1, and values kp1 and Tn1 being selected such that a desired behavior such as a time constant and a transient characteristic, is present for a drive train free of play with a constant total moment of inertia.
Figure 5:
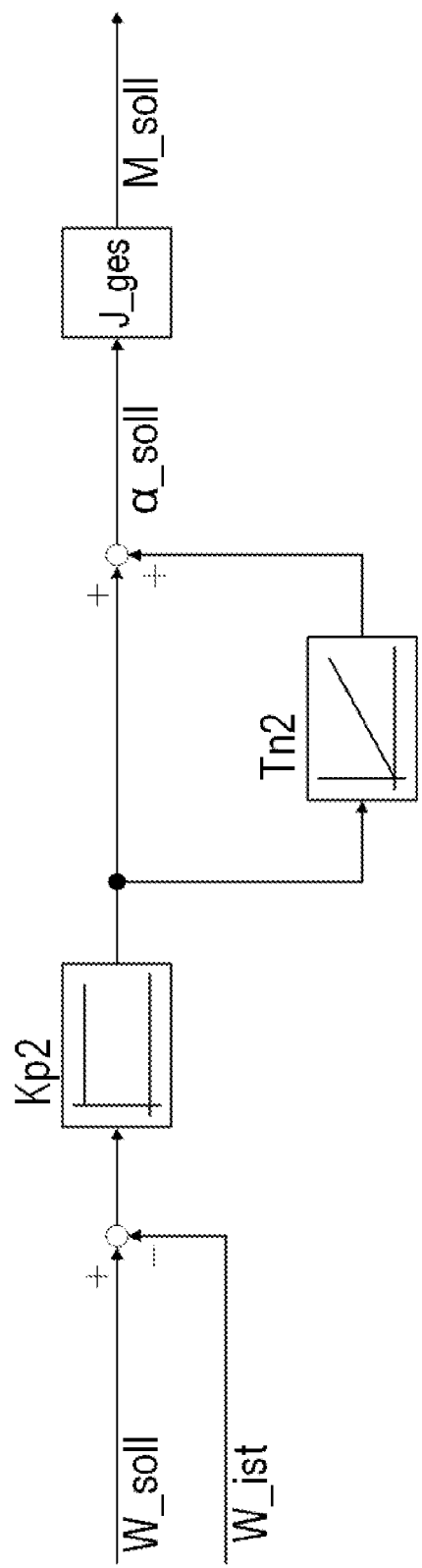

In contrast to FIG. 4, the drive train schematically illustrated in FIG. 5 exhibits play, i.e., backlash, and the proportionality constant Kp2 of the proportional element characteristic parameter Tn2 of the integral element are selected such that a behavior is achieved that resembles the behavior illustrated in FIG. 4 to the greatest degree possible.

DETAILED DESCRIPTION

As schematically illustrated in the Figures, in a method for a motor control according to an example embodiment of the present invention, a converter supplies a motor voltage U, e.g., a three-phase voltage, to an electric motor 33, which, for example, is arranged as a three-phase motor.

With the aid of a sensor, the angular position of a rotor shaft of electric motor 33 is acquired and forwarded as actual value x ist to an rpm controller, which determines from the system deviation of actual value x_ist from a setpoint value x_Soll, which, for example, is predefined as a parameter value, a value of an actuation variable.

Figure 1:
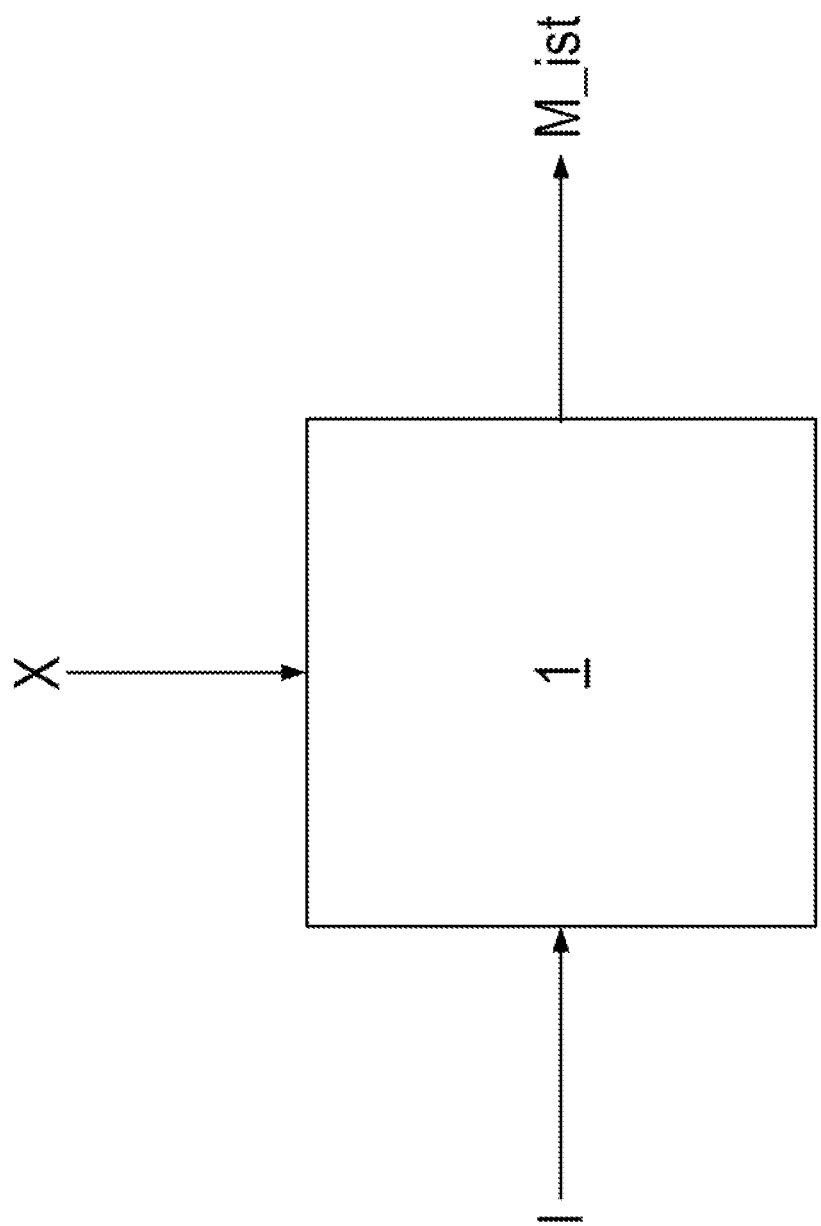
FIG. 1 schematically illustrates a device 1 for determining torque actual value M_ist, which determines an actual value M_ist for torque M_ist from motor current I and angular position x.
Figure 2:
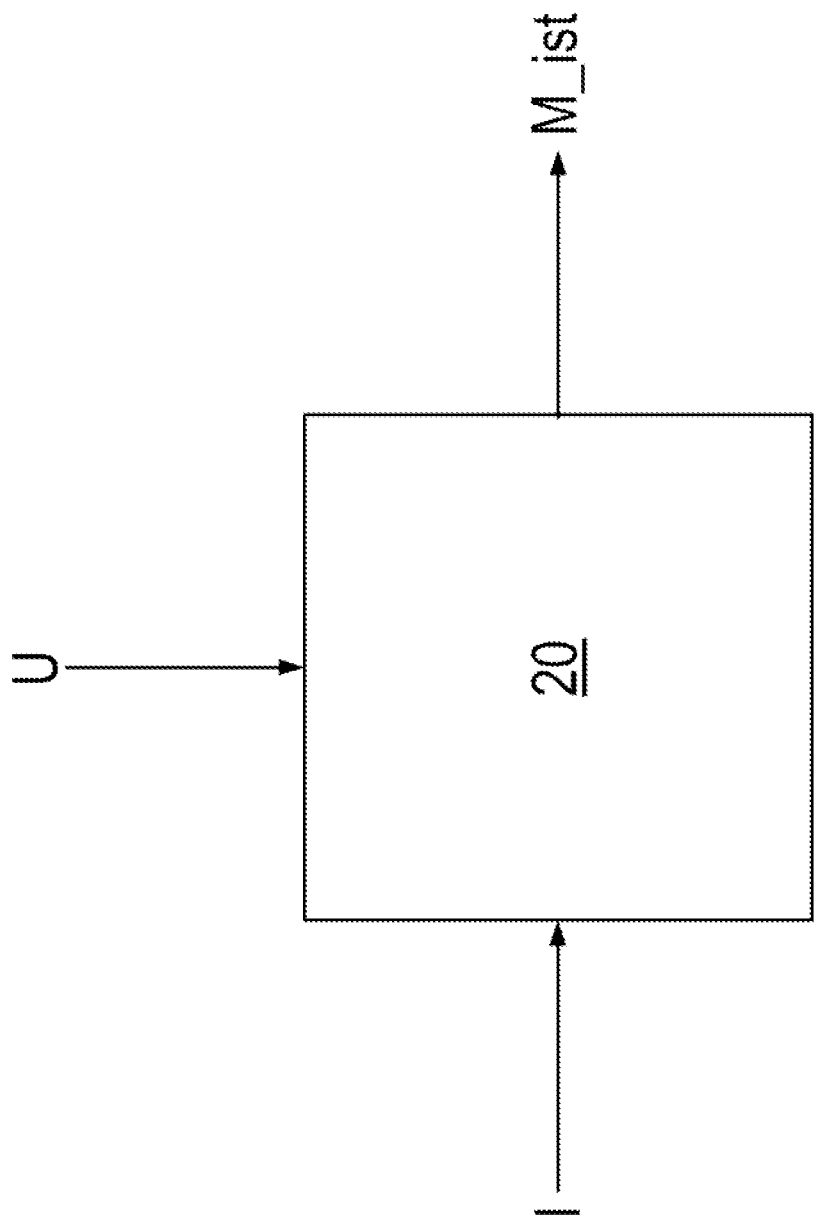
FIG. 2 schematically illustrates an alternative device 20 for determining torque actual value M_ist, which determines an actual value M_ist for the torque from motor current I and motor voltage U.
Figure 3:
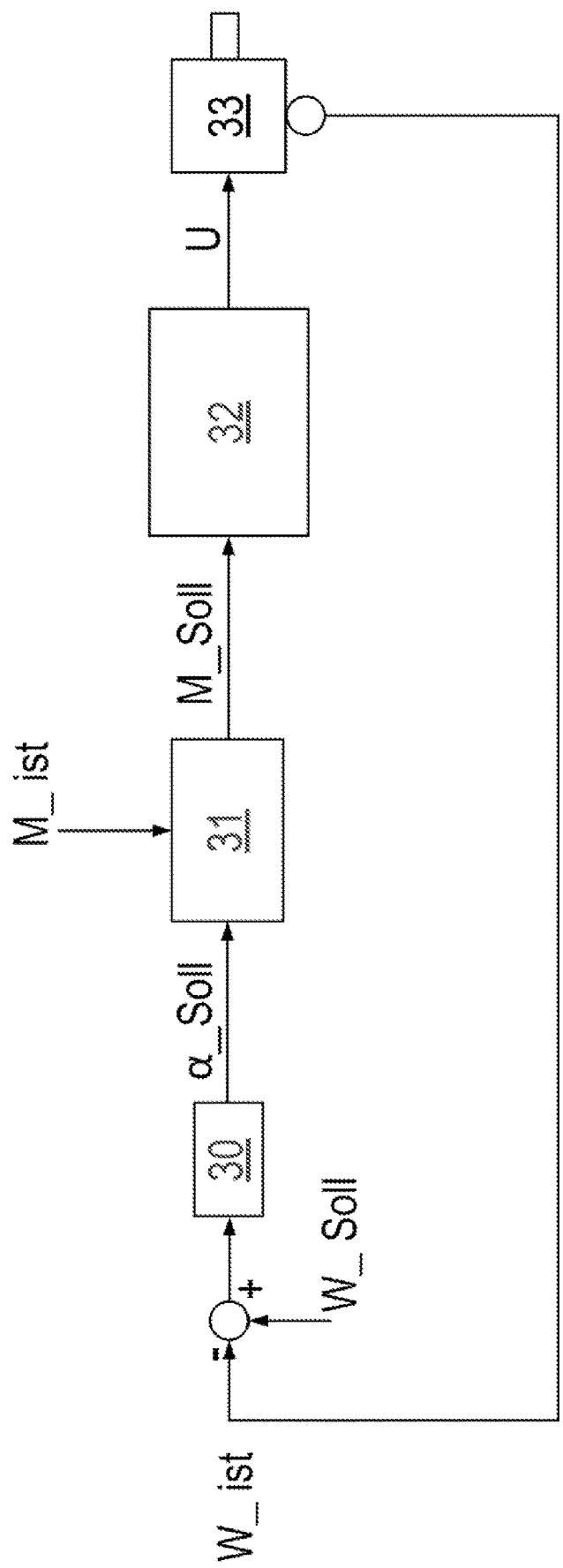
FIG. 3 schematically illustrates an rpm control member 30 from whose actuation value α_Soll, that is to say, for example, from a setpoint value α_Soll for an angular acceleration, a torque setpoint value M_Soll is determined using torque actual value M_ist, which is input to a motor control which supplies a motor voltage U to an electric motor 33.

As illustrated in FIG. 1, the actuation variable is, for example, provided as a setpoint value α_Soll for an angular acceleration.

This actuation variable is transmitted to device 31 for determining torque setpoint value M_Soll, which determines torque setpoint value M_Soll while taking torque actual value M_ist into account.

It is forwarded to motor control device 32 as a setpoint value, and motor control device 32 supplies a motor voltage U to electric motor 33 as a function of this setpoint value.

A sensor acquires the angular position, i.e., angular position x, of the rotor of electric motor 33, rpm actual value ω_ist is determined therefrom, and the difference between rpm setpoint value ω_Soll and rpm actual value co ist is forwarded as a system deviation to rpm control member 30, which, for example, is implemented as a linear controller such as a PI controller or a PID controller.

To determine torque setpoint value M_Soll, moment of inertia J_Last of the load driven by electric motor 33 is first determined in device 31 according to the following relationship:

$$J\_Last = M\_ist/(d\omega\_ist/dt) - J\_mot.$$

In this context, J_mot is the moment of inertia of the rotor of electric motor 33 known as a parameter of the electric motor, and dω_ist/dt is the time derivative of the angular velocity determined from the acquired angle values. In addition, torque actual value M_ist is determined by device 1 for determining the torque actual value or by device 20 for determining the torque actual value.

Based on determined moment of inertia J_Last and moment of inertia J_Mot available as a parameter, total moment of inertia J_ges, or in other words, the total mass inertia, is able to be determined by a summation J_ges=J_Mot+J_Last.

This is used for determining torque setpoint value M_Soll according to the relationship:

M_Soll=J_ges*α_Soll

Thus, torque setpoint value M_Soll is determined by a simple multiplication of total moment of inertia J_ges by actuation variable α_Soll of rpm control member 30.

According to example embodiments of the present invention, the correct load mass inertia thus is available to the control at all times because it is able to be adjusted during the operation.

In another exemplary embodiment, if an additional torque such as a load torque, i.e., a torque introduced by the load into the drive train, or a friction torque occurs in addition to the torque for accelerating the drive, two ranges having different accelerations are utilized for determining the change ΔJ_Last of the moment of inertia, according to the relationship:

ΔJ Last=M_ist_1/(dω_ist_1/dt)−M_ist_2/(dω_ist_2/dt)

where dω_ist_1/dt is the time derivative of the angular velocity, i.e., the angular acceleration, which lies in the first range, and M_ist_1 is the associated torque actual value, where dω_ist_2/dt is the time derivative of the angular velocity, i.e., the angular acceleration, which lies in the second range, and M_ist_2 is the associated torque actual value.

Moment of inertia J_Mot of the rotor of the electric motor is constant so that change ΔJ_ges of total moment of inertia J_ges corresponds to the change ΔJ_Last of moment of inertia of the load.

The first range is a value range of the angular acceleration, and the second range is another value range of the angular acceleration; the two value ranges do not overlap and are spaced apart from each other.

The determination of torque actual value M_ist_1 and of angular acceleration dω_ist_1/dt from the first range is carried out at a different time from the determination of torque actual value M_ist_2 and angular acceleration dω_ist_2/dt from the second range.

Moment of inertia J_Last is therefore able to be adapted to the change.

For example, the drive accelerates a load in a first time segment, and a first acceleration value occurs. In a subsequent time segment, the rotational speed of the motor is kept constant, and in a following, third time segment, the load is decelerated so that a second acceleration value occurs. The second acceleration value may be equal to the first acceleration value in its absolute amount.

Thus, the determination of moment of inertia J_Last of the load is able to be carried out by such a driving process, the influence of the friction being eliminated.

In this manner, the moment of inertia is able to be determined, e.g., adapted, during the ongoing operation of the system including the drive. Whenever the acceleration lies in the first range or in the second range, the respective quotient of the associated torque actual value and the angular acceleration is able to be updated.

Thus, even if there is a change in the load mass inertia during the operation, moment of inertia J_Last, and thus the total moment of inertia of the drive train including the load and the rotor, is able to be determined in an updating manner.

A drive train should be understood as electric motor 33 supplied by the converter together with the load driven by electric motor 33, possibly via a gear unit.

In further exemplary embodiments, the value characteristic of the load moment of inertia is additionally filtered in a suitable manner in order to reduce noise caused by noise of the measuring variables.

As schematically illustrated in FIG. 4, values Kp1 and Tn1 are selected so that the desired behavior occurs when the drive train has no backlash, i.e., also no play. The moment of inertia to be driven by the electric motor amounts to J_ges in this context.

As schematically illustrated in FIG. 5, other values that induce the same behavior in a drive train exhibiting backlash, i.e., play, as in the example embodiment illustrated in FIG. 4 are able to be used.

Kp2 is used as the value of the proportionality constant of the proportional element, and Tn2 is used as a time constant of the integral element.

A stable control behavior is achievable in particular if the following applies:

Kp2=Kp1*J_Mot/(J_Mot+J_Last)

Tn2=Tn1*(J_Mot+J_Last)/J_Mot

Here, total moment of inertia J_ges is equal to the sum of J_Mot and J_Last, in which case moment of inertia J_Mot pertains to the particular rotatably mounted part of the drive train that describes the rotor of the electric motor of the drive train up to the connection featuring play, e.g., up to the backlash, of the drive train, and J_Last describes the remaining part of the drive train.

According to example embodiments of the present invention, J_Last is determined, which therefore allows for an adaptation of the values.

In further exemplary embodiments of the present invention, values according to the relatioships:

Kp2=Kp1*f(J_Mot,J_ges)

Tn2=Tn1*g(J_Last,J_ges)

are used, with f and g being functions.

The separate determination of J_Last and J_Mot is therefore necessary. To this end, J_Mot is able to be determined in a first method step by determining J_Mot according to M_ist_1/(dω_ist_1/dt) when no load is present or when no load is coupled with the rotor shaft of the electric motor of the drive shaft. In a second method step, load moment of inertia J_Last is then determined according to the relationship:

M_ist_1/(dω_ist_1/dt)−M_ist_2/(dω_ist_2/dt).

Later changes in the load moment of inertia J_Last are then correspondingly able to be determined in further method steps, or in other words, the value of load moment of inertia J_Last is adaptable.

In further exemplary embodiments of the present invention, values are used according to the relationships:

Kp2=Kp1*f(J_Last,J_ges)

Tn2=Tn1*g(J_Mot,J_ges)

and f and g are functions.

Thus, the separate determination of J_Last and J_Mot is required. For this purpose, J_Mot is able to be determined in a first method step in that J_Mot is determined according to M_ist_1/(dω_ist_1/dt) when no load is present or when no load is coupled with the rotor shaft of the electric motor of the drive train. In a second method step, load moment of inertia J_Last is then determined according to the relationship:

$$M\_ist\_1/(d\omega\_ist\_1/dt)-M\_ist\_2/(d\omega\_ist\_2/dt)$$

Later changes in the load moment of inertia J_Last are then correspondingly able to be determined in further method steps, or in other words, the value of load moment of inertia J_Last is adaptable.

In further exemplary embodiments of the present invention, values are used according to the relationships:

$$Kp2=Kp1*f(J\_Mot\times J\_Last)$$

$$Tn2=Tn1*g(J\_Mot\times J\_Last)$$

and f and g are functions and therefore depend on the product of the two moments of inertia.

The separate determination of J_Last and J_Mot is therefore required. For this purpose, J_Mot is able to be determined in a first method step by determining J_Mot according to M_ist_1/(dω_ist_1/dt) while no load is present or while no load is coupled with the rotor shaft of the electric motor of the drive train. In a second method step, load moment of inertia J_Last is then determined according to the relationship:

$$M\_ist\_1/(d\omega\_ist\_1/dt)-M\_ist\_2/(d\omega\_ist\_2/dt)$$

Later changes in the load moment of inertia J_Last are then correspondingly able to be determined in later method steps, or in other words, the value of load moment of inertia J_Last is adaptable.

LIST OF REFERENCE CHARACTERS

1 device for determining the torque actual value
20 device for determining the torque actual value
30 rpm controller
31 device for determining the torque setpoint value
32 motor control device
33 electric motor, e.g., three-phase motor
I motor current, e.g., motor current space vector
U motor voltage, e.g., motor voltage space vector
X angular position
ω_ist actual value of the angular velocity
ω_Soll setpoint value of the angular velocity
α_Soll setpoint value for the angular acceleration
M_ist actual value of the torque

The invention claimed is:

1. A method for operating a drive train, including an electric motor, a load driven by the electric motor and/or a gear unit driven by the electric motor, and a sensor for acquiring an angular position of a rotor of the electric motor, comprising:
supplying a motor voltage to the electric motor via a converter to achieve a torque setpoint value;
determining an angular velocity actual value and an angular acceleration actual value from acquired values of the angular position of the rotor;
determining the torque setpoint value from a total moment of inertia and an angular acceleration setpoint value determined as an actuation variable by an rpm control member to which a difference between the angular velocity actual value and an angular velocity setpoint value is supplied;
determining the total moment of inertia as a sum of a moment of inertia of the drive train without a load and a moment of inertia of the load;
determining the moment of inertia of the load from a torque actual value and from the angular acceleration actual value, taking into account the moment of inertia of the drive train;
wherein the rpm control member includes a PI controller, having a proportional element and an integral element arranged in parallel with the proportional element, a proportionality constant of the proportional element is a function of the moment of inertia of the drive train and the total moment of inertia, and a time constant of the integral element is a function of the moment of inertia of the load and the total moment of inertia.

2. The method according to claim 1, wherein the sensor is arranged on the electric motor.

3. The method according to claim 1, wherein the motor voltage is supplied to the electric motor via a motor control device of the converter.

4. The method according to claim 1, wherein the angular velocity actual value and the angular acceleration actual value are determined recurrently over time.

5. The method according to claim 1, wherein the torque actual value is determined from a motor current, acquired by a current sensor, and from the acquired values of the angular position of the rotor.

6. The method according to claim 1, wherein the torque actual value is determined from a motor current acquired by a current sensor and from an acquired motor voltage and/or from the acquired values of the angular position of the rotor.

7. The method according to claim 1, wherein the moment of inertia of the drive train without a load is predefined as a parameter.

8. The method according to claim 1, wherein the torque setpoint value is formed as a product of the total moment of inertia and the angular acceleration setpoint value.

9. The method according to claim 1, wherein the moment of inertia of the load is determined as a quotient, of the torque actual value and the angular acceleration actual value, reduced by the moment of inertia of the drive train.

10. A method, comprising:
supplying a motor voltage to the electric motor via a converter to achieve a torque setpoint value;
determining an angular velocity actual value and an angular acceleration actual value from acquired values of the angular position of the rotor;
determining the torque setpoint value from a total moment of inertia and an angular acceleration setpoint value determined as an actuation variable by an rpm control member to which a difference between the angular velocity actual value and an angular velocity setpoint value is supplied;
determining the total moment of inertia as a sum of a moment of inertia of the drive train without a load and a moment of inertia of the load;
determining the moment of inertia of the load from a torque actual value and from the angular acceleration actual value, taking into account the moment of inertia of the drive train;
wherein the rpm control member includes a PI controller, having a proportional element and an integral element arranged in parallel with the proportional element, a proportionality constant of the proportional element is a function of the moment of inertia of the load and the total moment of inertia, and a time constant of the integral element is a function of the moment of inertia of the drive train and the total moment of inertia.

11. A method, comprising:

supplying a motor voltage to the electric motor via a converter to achieve a torque setpoint value;

determining an angular velocity actual value and an angular acceleration actual value from acquired values of the angular position of the rotor;

determining the torque setpoint value from a total moment of inertia and an angular acceleration setpoint value determined as an actuation variable by an rpm control member to which a difference between the angular velocity actual value and an angular velocity setpoint value is supplied;

determining the total moment of inertia as a sum of a moment of inertia of the drive train without a load and a moment of inertia of the load;

determining the moment of inertia of the load from a torque actual value and from the angular acceleration actual value, taking into account the moment of inertia of the drive train;

wherein the rpm control member includes a PI controller, having a proportional element and an integral element arranged in parallel with the proportional element; and wherein a proportionality constant of the proportional element is a function of a product of the moment of inertia of the drive train and the moment of inertia of the load, and/or a time constant of the integral element is a function of a product of the moment of inertia of the drive train and the moment of inertia of the load.

12. A method, comprising:

supplying a motor voltage to the electric motor via a converter to achieve a torque setpoint value;

determining an angular velocity actual value and an angular acceleration actual value from acquired values of the angular position of the rotor;

determining the torque setpoint value from a total moment of inertia and an angular acceleration setpoint value determined as an actuation variable by an rpm control member to which a difference between the angular velocity actual value and an angular velocity setpoint value is supplied;

determining the total moment of inertia as a sum of a moment of inertia of the drive train without a load and a moment of inertia of the load;

determining the moment of inertia of the load from a torque actual value and from the angular acceleration actual value, taking into account the moment of inertia of the drive train;

wherein at a first instant, the moment of inertia of the load is determined as a first quotient, reduced by the moment of inertia of the drive train, of the torque actual value and the angular acceleration actual value $\alpha\_ist$, and the angular acceleration actual value lies in a first value range;

wherein at a second instant after the first instant, the moment of inertia of the load is determined as a second quotient, reduced by the moment of inertia of the drive train, of the torque actual value and the angular acceleration actual value, and the angular acceleration actual value lies in a second value range; and wherein an updated moment of inertia of the load is determined by adding to the previously determined value of the moment of inertia of the load a difference between the second quotient and the first quotient.

13. The method according to claim 12, wherein the first value range is a value range of angular acceleration, and the second value range is a further value range of angular acceleration, and the two value ranges do not overlap but are spaced apart from each other.

14. The method according to claim 1, wherein determined values of the moment of inertia of the load are filtered and/or low-pass-filtered.

15. A drive train adapted to perform the method recited in claim 1.

16. The method according to claim 1, wherein the moment of inertia of the load is determined according to the relationship:

$$J\_Last = M\_ist/\alpha\_ist - J\_Mot,$$

J_Last representing the moment of inertia of the load, M_ist representing the torque actual value, $\alpha\_ist$ representing the angular acceleration actual value, and J_Mot representing the moment of inertia of the drive train.

17. A method for operating a drive train, including an electric motor, a load driven by electric motor and/or by a gear unit driven by the electric motor, the load being variable over time, and a sensor for acquiring an angular position of a rotor of the electric motor, a moment of inertia of the drive train without a load being constant over time and being predefined as a parameter, a motor voltage being made available to the electric motor by a converter to achieving a torque setpoint value, comprising:

determining an angular velocity actual value and an angular acceleration actual value from values of the angular position of the rotor acquired by the sensor;

determining the torque setpoint value from a total moment of inertia and an angular acceleration setpoint value determined as an actuation variable by an rpm control member to which a difference is supplied between the angular velocity acceleration actual value and the angular velocity setpoint value;

determining the total moment of inertia as a sum of the moment of inertia of the drive train without a load and the moment of inertia of the load;

determining the moment of inertia of the load from a torque actual value and from the angular acceleration actual value, taking into account the moment of inertia of the drive train;

determining a value of the moment of inertia of the load, including:

determining the torque actual value;

predefining as a parameter the moment of inertia of the drive train without a load; and determining the moment of inertia of the load as a quotient, reduced by the moment of inertia of the drive train, of the torque actual value and the angular acceleration actual value; and after determining the value of the moment of inertia of the load, determining an updated value of the moment of inertia of the load, including:

at a first instant, determining the moment of inertia of the load as a first quotient, reduced by the moment of inertia of the drive train, of the torque actual value and the angular acceleration actual value, the angular acceleration actual value lying in a first value range;

at a second instant following the first instant, determining the moment of inertia of the load as a second quotient, reduced by the moment of inertia of the drive train, of the torque actual value and the angular acceleration actual value, the angular acceleration value lying in a second value range; and determining an updated moment of inertia of the load by adding to a previously determined value of the moment of inertia of the load a difference between the second quotient and the first quotient.

18. A drive train adapted to perform the method recited in claim 17.

* * * * *